United States Patent
Pignataro, Jr.

[11] 3,714,959
[45] Feb. 6, 1973

[54] PERMANENT PIERCING ACCESS VALVE

[75] Inventor: Tony Pignataro, Jr., Montpelier, Ohio

[73] Assignee: Robinair Manufacturing Corporation, Montpelier, Ohio

[22] Filed: March 5, 1971

[21] Appl. No.: 121,357

[52] U.S. Cl. ................................................. 137/318
[51] Int. Cl. ........................ B23b 41/08, F16e 41/04
[58] Field of Search ...... 137/317, 318; 285/197, 198, 285/199

[56] References Cited

UNITED STATES PATENTS

| | | | |
|---|---|---|---|
| 3,495,615 | 2/1970 | Ehrens et al. | 137/318 |
| 3,240,230 | 3/1966 | Callahan, Jr. et al. | 137/608 |
| 3,450,149 | 6/1969 | Brinda | 137/318 |
| 3,580,269 | 5/1971 | Ehrens et al. | 137/318 |

*Primary Examiner*—Martin P. Schwadron
*Assistant Examiner*—David R. Matthews
*Attorney*—Burton & Parker

[57] ABSTRACT

A permanent access valve for use in sealed fluid systems to pierce a fluid line thereof without leaking fluid from the system or allowing contaminants to enter the system. The device includes a straddle nut having a tube embracing portion adapted to be soldered or brazed to the fluid line, and a valve body threadably engageable within the straddle nut. A piercing needle is rotatably supported within the body, and has a line-piercing portion which projects through an aperture in the nut and pierces the fluid line as the valve body is screwed into the nut. The piercing portion of the needle is rearwardly tapered to engage the marginal edge of the aperture in the straddle nut before penetration of the fluid line, thereby providing an initial seal to prevent the escape of fluid or entry of contaminants before the tube is pierced, and additionally to prevent rotation of the needle during the actual piercing of the tube. Additional sealing around the needle is accomplished as the valve body is completely engaged within the straddle nut.

7 Claims, 4 Drawing Figures

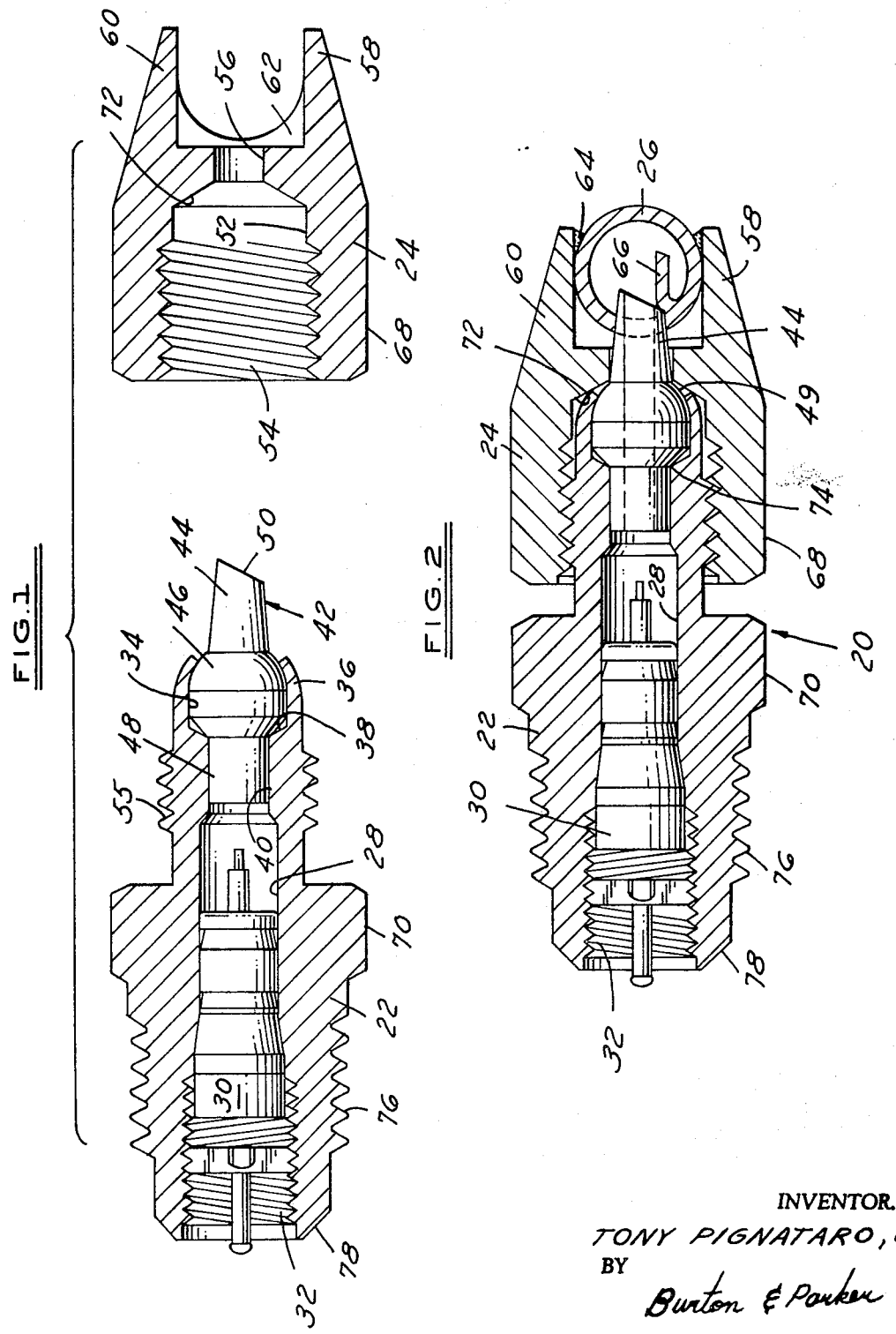

3,714,959

PERMANENT PIERCING ACCESS VALVE

BACKGROUND OF THE INVENTION

The invention relates to valve assemblies for obtaining access to a fluid line in a closed fluid system, such as a refrigeration unit or the like, without disturbing the system. In gaining access to the system by piercing one of the lines, it is imperative both to insure against the escape of fluid from the system and to prevent contaminants such as air and/or moisture from entering the system. The instant device is utilizable to gain access to the fluid system while preserving the hermetically sealed characteristic thereof, either when the system is pressurized or when it is unpressurized.

Access valves of the general type disclosed herein are known in the prior art, as exemplified by recently issued U. S. Pat. Nos. 3,450,149 and 3,495,615. Some of these devices, such as shown in U.S. Pat. No. 3,450,149, rely upon the piercing element itself to provide a seal between the device and the tube, but this has not been found to be effective. As set forth in detail hereinbelow, the device embodying the instant invention provides a positive seal between the line-engaging member or straddle nut and the piercing needle prior to penetration of the tube by the needle.

A problem encountered with the use of some prior art devices is that the piercing element may chip off small bits of tubing which can enter the system and become lodged in constricted portions of the lines or orifices, causing the system to malfunction. One attempt at solving this problem is disclosed in U.S. Pat. No. 3,495,615, wherein the piercing element is freely rotatably carried by the valve stem member which functions to drive the piercing element through the pipe upon threaded engagement of the valve stem within the threaded valve body. As the piercing element contacts the pipe to be pierced, further rotational movement is prevented during the actual piercing operation. This construction relies upon the frictional engagement of the piercing element against the pipe or tube to prevent rotation of the element during penetration, and therefore does not positively insure that the piercing element will not rotate slightly.

In the device disclosed herein, the piercing needle abuts the marginal edge of the straddle nut port before penetration of the tube, which abutment positively prevents rotation of the needle during the piercing operation. Therefore, this particular construction provides both a positive seal around the piercing needle and in addition prevents rotational movement of the needle during the piercing operation. Preferably, the needle member is made of a relatively hard material such as drill rod or tool steel, and the nut is constructed of a softer metal such as brass, so that there is a resilient deformation of the straddle nut port as the needle abuts the port, thereby insuring a fluid-tight seal.

SUMMARY OF THE INVENTION

In an access fitting for a sealed fluid system comprising a tapered piercing needle freely rotatably projecting from a fitting body, and fluid line-engaging means having a port aligned with and adjacent to the portion of the line to be pierced, the line-engaging means and fitting body having cooperating threads to advance the needle upon threaded engagement between said members with the needle engaging the port to provide a fluid seal therebetween and to prevent rotational movement of the needle during penetration of the fluid line. The access fitting comprises essentially only two separate parts, the line engaging member or straddle nut, and the fitting body with the piercing needle held captive therein, enabling simple and convenient operation of the device. The fitting body is preferably provided with valve means to control the introduction of additional fluid into the system or exhaust excess fluid from the system.

DESCRIPTION OF THE DRAWINGS

FIG. 1 is a longitudinal cross-section of a piercing access valve embodying the invention, showing the parts thereof in unassembled position;

FIG. 2 is a longitudinal section similar to FIG. 1 showing the assembled access valve in operable position on a fluid line;

DESCRIPTION OF THE PREFERRED EMBODIMENT

Figure 3:
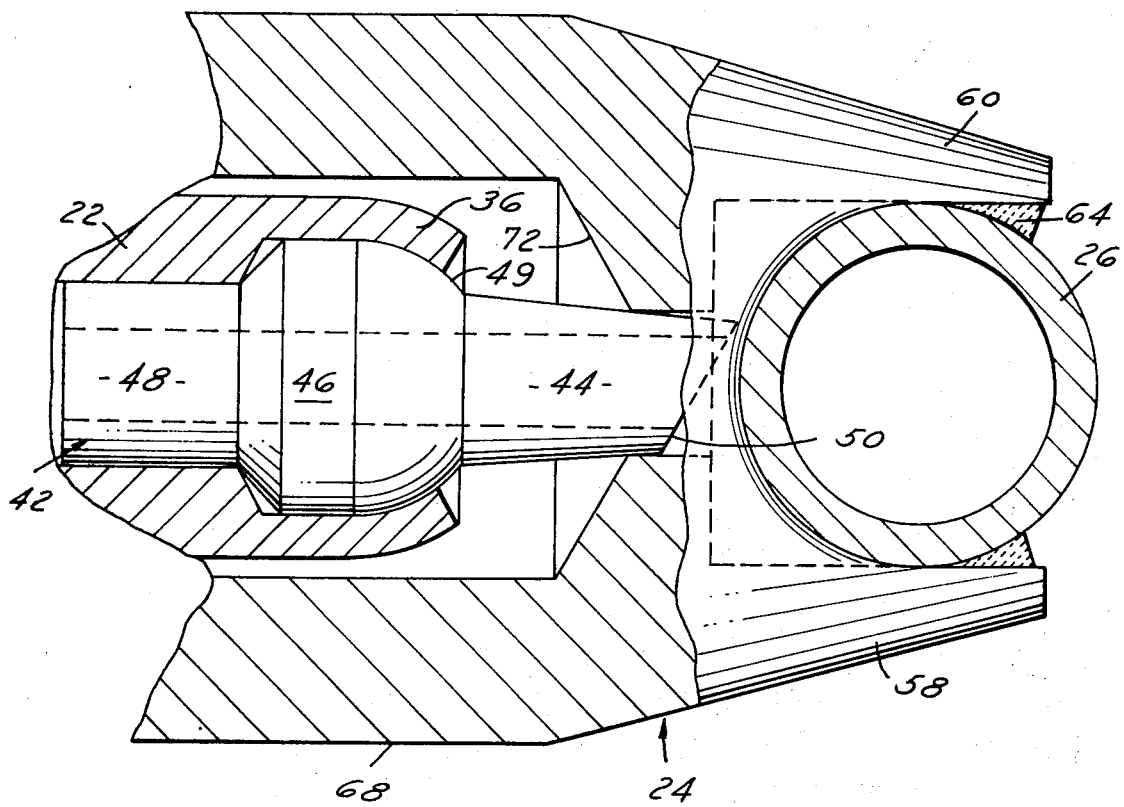
FIG. 3 is an enlarged partial longitudinal section showing the relationship of the parts of the device assembled on a fluid line just prior to engagement of the piercing element with the line.

Referring now more particularly to the drawings, there is shown a permanent piercing access valve generally designated 20 in FIG. 2 which comprises a valve body 22 and a line-engaging means or straddle nut 24 which is adapted to be sealingly engaged upon a tube or pipe 26. The valve body 22 is provided with a longitudinal fluid passage 28 opening therethrough, providing a valve chamber at the rear end thereof within which a standard valve 30 may be disposed, such valve being similar in construction to the valves commonly used in automobile tires and the like, although other types of valves could be used in lieu thereof. The valve body passage is shown threaded as at 32 for reception of a standard valve 30. The forward end of the valve body 22 exhibits a generally cylindrically shaped recess 34 having an encircling wall 36 and a bottom wall 38. Rearwardly of the recess 34, a passage 40 of cylindrical configuration is provided establishing communication between the fluid passage 28 and the recess 34.

Mounted for free rotation within the forward end portion of the valve body 22 is a piercing needle member 42 having a tapered forward end portion 44, an enlarged intermediate portion 46, and a cylindrical rear end portion 48. The rear end portion 48 is slidably engageable within the cylindrical valve body passage 40, while the intermediate portion 46 is provided with a spherical forwardly facing surface 49 about which the valve body wall 36 may be swedged or spun to retain the needle 42 captive on the valve body 22, leaving the needle free to rotate in the body. Of course the needle need not be held captive within the valve body, but may be merely positioned therein prior to assembly of the valve body 22 and the straddle nut 24.

The forward end portion 44 of the needle 42 projects beyond the end of the valve body 22 and exhibits a tube piercing extreme end portion 50 adapted to cut through the tube 26. The needle portion 44 is rearwardly tapered from its forward end for purposes more fully explained hereinafter. Preferably the needle 42 is made of a relatively hard metal such as tool steel or drill rod, while the valve body 22 and straddle nut 24 are constructed of a somewhat softer material such as brass or the like.

The straddle nut 24 has an internal fluid passage 52 opening therethrough provided with an internally threaded length 54 threadably engageable with an externally threaded length 55 adjacent the forward end of the valve body 22. Fluid passage 52 in nut 24 terminates at its inner end in a port 56. Straddle nut 24 exhibits a tube embracing forward end including oppositely disposed arms 58 and 60 slidably receivable over the tube or pipe 26 to be pierced and an arcuately shaped bight portion 62 against which the tube 26 may seat. The nut 24 is adapted to be received laterally over the tube 26, and is thereafter brazed or soldered to the tube 26 as at 64 to provide a fluid-tight seal between the nut and the tube.

Figure 4:
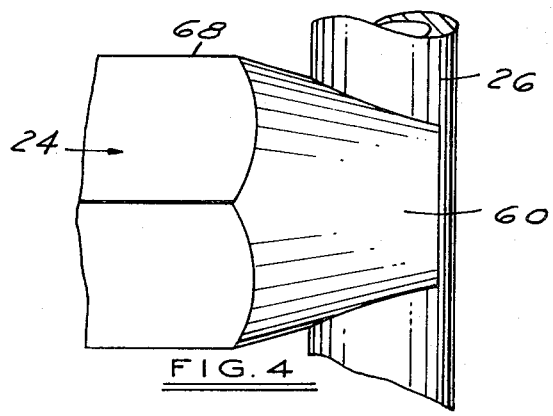
FIG. 4 is a partial top elevation showing the assembly of the device on the fluid line.

When it is desired to gain access to a tube or line such as 26, the straddle nut 24 is positioned with its projecting arms 58 and 60 embracing the tube, and the nut 24 is thereafter soldered or brazed to the tube as at 64 to provide a fluid-tight seal therebetween. With the tube nut positioned on the tube as shown in plan view in FIG. 4, the valve body 22 is threadably advanced into the straddle nut 24 with the piercing needle 42 projecting through the passage 52 and into the port 56.

As shown most clearly in FIG. 3, the piercing needle 42 is free to rotate with respect to the body 22, and as the valve body is threaded into the nut, the tapered forward end portion 44 of the needle enters the straddle nut port 56 and abuts against the marginal edge of the port just prior to penetration of the tube 26 by the cutting edge 50 of the needle. This abutment positively prevents any rotational movement of the needle with respect to the nut, and therefore also with respect to the tube 26 during the actual piercing of the tube. In addition, such abutment also provides a positive metal-to-metal seal between the needle portion 44 and the straddle nut port 56 before the needle penetrates the tube. Thus a positive seal against the escape of fluid from the tube and against entry of any contaminants into the tube is accomplished before the tube is actually pierced. As stated, the needle is preferably constructed of a relatively hard metal, while the nut is made of a softer metal, so that as the needle progressively enters the port, the walls of the port are caused to be resiliently deformed, which both increases the fluid seal therebetween and provides a tighter grip on the needle to prevent its rotation during the piercing of the tube 26.

As the piercing needle penetrates through the wall of the tube 26, it cuts through the tube without rotation shearing the tube and folding a portion of the tube inwardly, such portion being shown at 66 in FIG. 2. Because the needle cuts through the tube without rotation, the cutting action produces no chips or flakes of tube metal which could enter the system and lodge in a constriction or orifice to produce a malfunction. Both the straddle nut 24 and the valve body 22 are provided with polygonally shaped exterior portions as shown at 68 and 70 respectively for engagement by a wrench or similar tool during assembly. The nut 24 is preferably held stationary by a wrench or the like during threaded engagement of the valve body within the nut to prevent distortion of the tube during assembly.

While the straddle nut 24 has been shown soldered or brazed to the tube 26, it will be apparent to those skilled in the art that other means of securing the device on the tube prior to piercing may be utilized. For example, a clamping type arrangement such as shown in the aforementioned U.S. Pat. No. 3,495,615 may be employed.

Referring to FIG. 2, it can be seen that as the valve body 22 is tightened into the straddle nut 24, the inwardly swedged wall portion 36 of the valve body is entrapped between the surface of the nut shown at 72 surrounding the port 56 and the domed surface 49 of needle 42, thereby establishing a positive fluid-tight seal therebetween. As the forward end portion of the valve body bottoms against the surface 72 of the nut 24, the wall portion 36 is urged against needle surface 49, forcing the piercing needle 42 rearwardly, thereby providing an additional fluid seal circumferentially about the needle at the point indicated by the numeral 74 in FIG. 2. There are thus provided three separate seals when the device is finally assembled, first the seal between the tapered needle portion 44 and the straddle nut port 56, second the seal formed by the entrapment of the forward end wall 36 of the valve body between nut surface 72 and needle surface 49, and third the circumferential seal between the needle 42 and the valve body indicated at 74.

The valve body 22 is provided at its rearward end with an externally threaded length 76 and a male flare portion 78 for suitable securement to a fluid line or the like which may be coupled to a source of supply fluid for charging the system.

What is claimed is:

1. In an access fitting for tapping through the wall of a fluid line, straddle nut means for sealingly engaging the fluid line prior to tapping the same and including a bore opening outwardly at one end and opening toward the line wall at the opposite end, a hollow needle in said bore for axial displacement therein toward and puncture of the line wall and having a portion tapering to a piercing end, fluid-conducting means in the bore behind and rotatably bearing against the needle and threadedly connected to the straddle nut means for displacing the needle toward and puncture of the line wall, and means in the bore surrounding the tapering portion of the needle for fluid tightly sealing the same in the bore and for preventing rotation thereof during axial displacement of the needle by said fluid-conducting means prior to and during puncture of the line wall.

2. In an access fitting for tapping through the wall of a fluid line, straddle nut means for sealingly engaging the fluid line prior to tapping the same and including a bore opening toward the line wall through an ensmalled bore portion, a hollow piercing needle in said bore for axial displacement therein toward and puncture of the line wall and having a tapering portion formed of a harder material than the material of said ensmalled bore portion and sized to be a forced fit therein prior to puncture of the line wall, said force fit of the tapered needle in said ensmalled bore portion preventing rotation of the piercing needle and effecting a fluid-tight seal of the needle with said bore portion prior to and during puncture of the line wall by the needle, and means in said bore portion threadedly connected to the straddle nut means and rotatably bearing against the piercing needle for axially displacing the needle in the bore to puncture the line wall.

3. The invention defined in claim 2 characterized in that said ensmalled bore portion is cylindrical with an interference diameter in relation to the tapered portion of the needle such that as the needle is axially displaced through the ensmalled bore portion such bore portion is reformed to the taper of the needle to effect a fluid-tight seal therewith and prevent rotation of the needle.

4. The invention defined by claim 2 characterized in that there is a chamfered seat extending between the bottom of said bore and the ensmalled bore portion providing a sealing surface, and said means in the bore for displacing the needle includes a fluid-conducting member provided with a needle-receiving socket at the inner end, and the needle includes an enlarged ball-like end rotatably received in said socket, and the exterior of the socket being adapted to bear against said chamfered seat to be deformed thereby against the ball-like end of the needle and effect a fluid-tight seal therewith and with the chamfered seat of the bore.

5. An access fitting comprising, in combination: a straddle nut adapted to sealingly engage the wall of a line to be tapped and provided with an external wrench-engaging surface and a threaded bore terminating at its inner end in a chamfered seat and an ensmalled cylindrical bore portion adjacent the line wall, a fitting body having an externally threaded end portion for threaded engagement in said bore and an axial passageway opening through opposite ends of the body, said bore at the threaded end of the body provided with a socket-like recess opening toward the ensmalled bore of the nut, a hollow piercing needle of harder material than the straddle nut having a ball-like enlargement adjacent one end received in said socket-like recess and a tapered portion projecting beyond the fitting body and terminating in a piercing point, said tapered portion of the needle having an interference fit with the ensmalled bore of the straddle nut before the piercing point punctures the line wall to reform the ensmalled bore of the nut to conform to the taper and grip the needle preventing rotation thereof and effecting a seal therewith, and the end of the fitting body surrounding the needle adapted to bear against said chamfered seat and limit penetration of the needle through the line wall and swage the wall of the socket-like recess into fluid-tight engagement with the ball-like enlargement of the needle while establishing a seal between the chamfered seat and such end of the fitting body.

6. The invention defined by claim 5 characterized in that said fitting body is provided with an external wrench-engaging surface and valve means in the bore of the fitting body.

7. The invention defined by claim 5 characterized in that the needle is provided with a cylindrical portion on the opposite side of the ball-like enlargement from the tapered portion and which cylindrical portion is rotatably received in a cylindrical bore portion of the fitting body adjacent the socket-like recess.

* * * * *